United States Patent [19]
Park

[11] Patent Number: 5,020,377
[45] Date of Patent: Jun. 4, 1991

[54] LOW PRESSURE TRANSDUCER USING METAL FOIL DIAPHRAGM

[75] Inventor: Kyong Park, Thousand Oaks, Calif.

[73] Assignee: Kavlico Corporation, Moorpark, Calif.

[21] Appl. No.: 468,608

[22] Filed: Jan. 23, 1990

[51] Int. Cl.⁵ .............................................. G01L 9/12
[52] U.S. Cl. ...................................... 73/718; 73/724; 361/283
[58] Field of Search ...................... 73/718, 724; 338/4, 338/42; 361/283

[56] References Cited

U.S. PATENT DOCUMENTS

| 2,999,386 | 9/1961 | Wolfe . | |
| 4,168,518 | 9/1979 | Lee | 73/724 |
| 4,178,621 | 12/1979 | Simonelic et al. | 73/718 |
| 4,227,419 | 10/1980 | Park | 73/724 |
| 4,287,553 | 9/1981 | Braunlich | 73/724 |
| 4,329,732 | 5/1982 | Kavli et al. . | |
| 4,340,409 | 7/1982 | Brooks et al. | 73/718 |
| 4,358,814 | 11/1982 | Lee . | |
| 4,388,668 | 6/1983 | Bell et al. . | |
| 4,398,426 | 8/1983 | Park et al. . | |
| 4,422,125 | 12/1983 | Antonazzi et al. | 73/718 |
| 4,426,673 | 1/1984 | Bell et al. . | |
| 4,466,289 | 8/1984 | Lam . | |
| 4,527,428 | 7/1985 | Shimada et al. | 73/718 |
| 4,565,096 | 1/1986 | Knecht | 73/718 |
| 4,587,851 | 5/1986 | Mortberg | 73/724 |
| 4,606,228 | 8/1986 | Whitmore . | |
| 4,617,607 | 10/1986 | Park et al. . | |
| 4,785,669 | 11/1988 | Benson et al. . | |
| 4,875,135 | 10/1989 | Bishop et al. | 73/718 |

Primary Examiner—Joseph A. Orsino
Assistant Examiner—Brent A. Swarthout
Attorney, Agent, or Firm—Poms, Smith, Lande & Rose

[57] ABSTRACT

A low pressure transducer is disclosed which utilizes a stainless steel foil diaphragm. An electrically conductive layer is deposited onto a non-conductive planar disk to form one plate of a capacitor. An epoxy ring is silk-screened onto the non-conductive plate to form an insulative washer between the stainless steel foil and the conductive layer on the non-conductive plate. A stainless steel ring is placed on top of the stainless steel foil and pressed down toward the non-conductive plate until the capacitance formed by the conductive layer screened onto the non-conductive plate and the stainless steel foil diaphragm reaches a predetermined level.

17 Claims, 1 Drawing Sheet

U.S. Patent   June 4, 1991   5,020,377
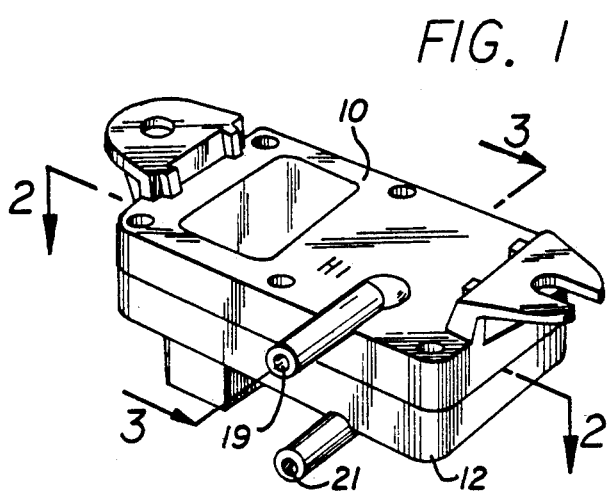
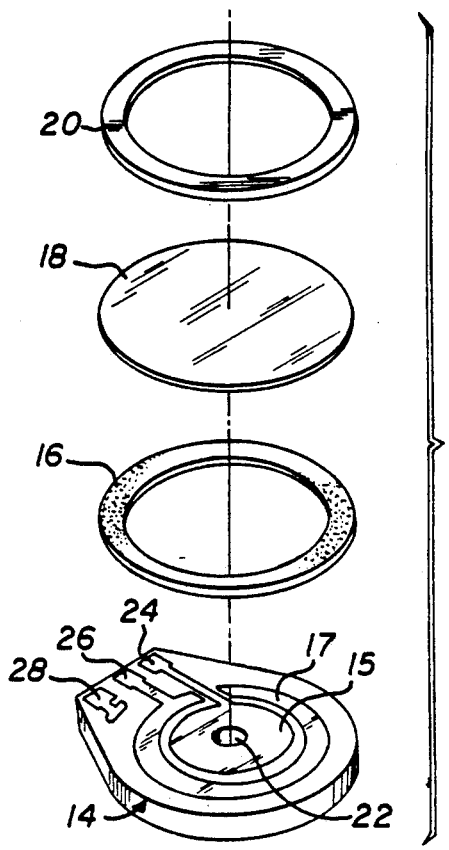
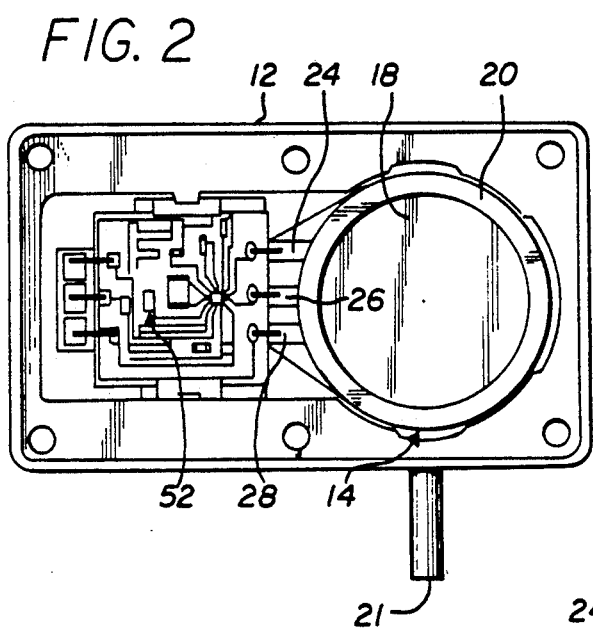
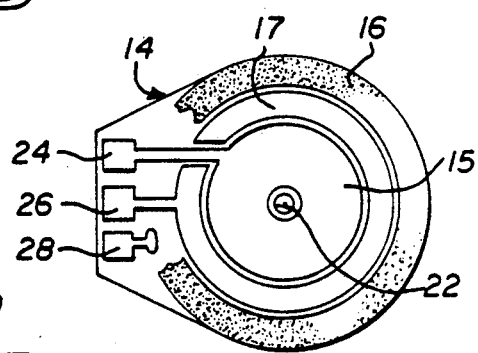
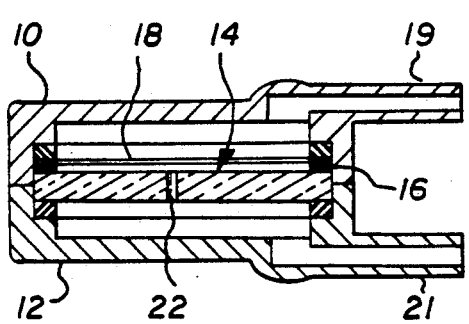

LOW PRESSURE TRANSDUCER USING METAL FOIL DIAPHRAGM

FIELD OF THE INVENTION

This invention relates to pressure transducers and, more particularly, to low pressure capacitive-type pressure transducers utilized in conjunction with electronic circuits.

BACKGROUND OF THE INVENTION

It has previously been proposed to make pressure transducers in which capacitive plates are spaced apart and mounted on one or more ceramic diaphragms. Such a transducer is disclosed, for example, in U.S. Pat. No. 4,388,668 (the '668 patent) assigned to the assignee of the present invention. As disclosed in the '668 patent, one plate of a capacitor may be mounted on a flexible circular ceramic diaphragm made of alumina, and the other plate of the capacitor may be mounted in a facing relationship on a heavier substrate. The diaphragm may be spaced from the substrate around its periphery by the use of a glass frit, which not only spaces the diaphragm apart from the substrate but also seals the periphery of the diaphragm to the substrate. When pressure is applied to the outer surface of the diaphragm, it deflects toward the substrate and the two facing conductive plates come closer together. When the distance between the two capacitive plates changes, the capacitance between the plates changes. The changing capacitance can be detected by an electronic circuit as an indication of the pressure applied to the diaphragm.

The assignee of the present invention produces a full line of pressure transducers which utilize alumina ceramic diaphragms. Many of these transducers are patented. Many of the assignees transducers have certain similarities which allow for standardization of parts and manufacturing procedures across the whole line of transducers which the assignee produces.

For example, U.S. Pat. No. 4,227,419 issued Oct. 14, 1980 and assigned to the assignee of the present invention, illustrates one type of transducer produced by the assignee. The '419 patent shows a transducer with a diaphragm preferably made of alumina and also illustrates the circuit used to detect the changes in capacitance which indicate the pressure applied to the alumina diaphragm. U.S. Pat. No. 4,398,426 issued Aug. 16, 1983 to Park et al. (the '426 patent) also assigned to the assignee of the present invention, shows another transducer also produced by the assignee of the present invention. The '426 patent shows a circuit which improves the linearity of the output voltage versus pressure characteristic of the transducer.

A capacitive pressure transducer such as those disclosed in the '668 patent, the '426 patent and the '426 patent can be made with ceramic diaphragms as thin as 0.010 inches. However, if the ceramic diaphragm is made any thinner, it will crack. Transducers made with the thinnest possible ceramic diaphragms have a pressure range at full scale of approximately 5 psi (where one atmosphere is about 14.2 psi). Therefore, capacitive pressure transducers made with ceramic diaphragms are not useful in measuring pressure differences where the full scale range should be substantially less than 5 psi. In an application such as air conditioning system pressure measurements, for example, it would be useful to take measurements in the range of 0.18 psi.

Previously issued patents for low pressure transducers disclose transducers which are manufactured or shaped such that they are not compatible with the product line of the assignee of the present invention. For example, U.S. Pat. No. 4,606,228 issued Aug. 19, 1986 to Whitmore (the '228 patent) discloses a low pressure transducer which utilizes a diaphragm composed of a perforated metallic disc overlaid with a thin plastic film. The transducer assembly disclosed in the '228 patent, shown in FIG. 3, is completely incompatible with the assembly methods and product line of the assignee of the present invention. Furthermore, the diaphragm utilized in the transducer disclosed in the '228 patent is more expensive and difficult to manufacture.

Another low pressure transducer is disclosed in U.S. Pat. No. 4,358,814 issued Nov. 9, 1982 to Lee et al. (the '814 patent). The '814 patent discloses a transducer which uses a conductive deformable diaphragm which is stretched across a flange and held by a clamping ring. Manufacturing a transducer with such a diaphragm is also difficult and expensive. U.S. Pat. No. 4,785,669 issued Nov. 22, 1988, discloses a single fluid-pressure transducer unit which utilizes a sheet metal diaphragm and an elastically deformable electrode. U.S. Pat. No. 2,999,386 issued Sep. 12, 1961, discloses a thin deformable diaphragm which is under substantial radial tension. U.S. Pat. No. 4,466,289 issued Aug. 21, 1984, discloses a transducer which utilizes a metal diaphragm under uniform tension, which would appear to have relatively low capacitance and to be non-linear. Furthermore, the geometry of such a transducer system is totally incompatible with the product line of the assignee of the present invention.

Therefore, what is needed is a capacitive pressure transducer which utilizes a diaphragm which is sensitive to very slight pressure changes, is relatively inexpensive and simple to manufacture, is of a similar shape and geometry as the assignee's alumina disk diaphragm transducers and is therefore compatible with the product line of the assignee of the present invention. Such a transducer could utilize the electronic circuits disclosed in the '426 patent and the '419 patent.

SUMMARY OF THE INVENTION

A capacitive pressure transducer is constructed with a unique combination of a planar plate made from an insulating material and a diaphragm of stainless steel foil. An electrically-conductive layer is deposited onto the planar plate to form one plate of a capacitor and the stainless steel foil forms the other plate of the capacitor. Epoxy is silk-screened onto the planar plate to form an insulative washer between the stainless steel foil and the conductive layer on the planar plate. A stainless steel ring is then placed on top of the stainless steel foil and pressed down toward the planar plate until the capacitance formed by the conductive layer screened onto the planar plate and the stainless steel foil reaches a predetermined level. The stainless steel foil functions as a diaphragm, while the planar plate is relatively rigid.

When pressure is applied to the diaphragm, the diaphragm is displaced thereby changing the capacitance which can be detected by an electronic circuit as an indication of the value of the pressure applied to the capacitive pressure transducer.

Thus it can be seen that the present invention provides a low pressure capacitive transducer which is reliable, easy to manufacture and low in cost. The construction of the present invention results in a simplified method of making a capacitive pressure transducer which is very sensitive to extremely low changes in pressure with a high degree of accuracy and stability.

BRIEF DESCRIPTION OF THE PREFERRED EMBODIMENT

The above-mentioned description of the invention and other features and objects of the present invention will become more apparent by reference to the following description taken in conjunction with the accompanying drawings, wherein like reference numerals denote like elements and in which:

FIG. 1 is a perspective view of a preferred embodiment of the present invention.

FIG. 2 is a cross-sectional view taken along line 2—2 of FIG. 1;

FIG. 3 is a cross-sectional view taken along line 3—3 of FIG. 1;

FIG. 4 is a partially exploded view of the transducer of the current invention; and FIG. 5 is a top view of the planar diaphragm of the present invention with a portion of the epoxy removed to expose the electrical contacts.

DETAILED DESCRIPTION OF THE PREFERRED EMBODIMENT

Referring more specifically to the drawings, FIG. 1 is an embodiment of a low pressure transducer illustrating the principles of the present invention.

In FIG. 1 the capacitive transducer is located within the housing formed by the upper casing 10 and the lower casing 12.

FIG. 4 shows an exploded view of a preferred embodiment of the capacitive transducer of the present invention. The nonconductive plate 14 is preferably made of a ceramic material such as alumina. Two conductive surfaces, an inner conductive surface 15 and an outer conductive surface 17, are deposited on the nonconductive plate. A ring of epoxy adhesive 16 is silk-screened around the outer edge of the planar surface of the nonconductive plate. A stainless steel foil diaphragm 18 of a thickness which can range from $\frac{1}{2}$ to 3 mils but preferably of approximately 1 mil (0.001 inches) is placed on top of the ring of epoxy adhesive. Incidentally, the showing of FIG. 4 is not to scale, as the thickness of the foil diaphragm and the epoxy ring are such that a scale drawings of these dimensions is not practical. The stainless steel washer 20 is placed on top of and in alignment with the foil diaphragm. The stainless steel washer 20 is secured to the foil diaphragm 18 by spot welds, an adhesive, or in any appropriate manner.

The width of the epoxy ring is greater than that of the inner and outer conductive surfaces. This creates the capacitive gap between the foil diaphragm 18 and the inner conductive surface 15 and the outer conductive surface 17. The gap between the foil diaphragm 18 and the inner conductive surface 15 can range from $\frac{1}{2}$ to 20 mils. The epoxy ring 16 forms an essentially airtight seal between the foil diaphragm and the nonconductive plate.

The stainless steel washer 20 is forced downward toward the nonconductive plate and thereby reducing the gap between the foil diaphragm and the conductive surfaces on the nonconductive plate. The stainless steel washer 20 is forced downward until the capacitance of the capacitor formed by the foil diaphragm 18 and the inner conductive surface 15 is at the required level, ordinarily between 40 to 80 pico farads. Note that an extremely thin layer of insulative material may be placed between the foil diaphragm 18 and the inner 15 and outer 17 conductive surfaces to avoid a short circuit when excessive pressure is applied to the foil diaphragm.

The capacitive transducer is used to measure differences in pressure which are reflected by changes in the capacitance of the transducer. Referring now to FIG. 3, the lower or reference pressure is present at the opening 22 in the nonconductive plate and the higher pressure is applied to the surface of the foil diaphragm 18 which faces away from the nonconductive plate 14. The reference pressure enters the lower casing through port 21. The higher pressure reaches the surface of the foil diaphragm 18 which faces away from the nonconductive plate 14 by flowing through port 19.

The higher pressure forces the foil diaphragm 18 downward towards the inner and outer conductive surfaces 15 and 17 on the surface of the nonconductive plate 14 which causes a corresponding increase in the capacitance of the transducer. The capacitance of the transducer is measured at the leads indicated as 24, 26 and 28 in FIG. 4. The capacitance between the inner conductive surface and the foil diaphragm is measured across leads 24 and 28 and the capacitance between the outer conductive surface and the foil diaphragm is measured across leads 26 and 28.

The inner conductive layer and the foil diaphragm form the main variable capacitor $C_p$ and the outer conductive surface of the foil diaphragm form the smaller compensating variable capacitor $C_{rs}$. The external connections to the two conductive surfaces are made by radially extending portions of the conductive coating which engage leads 24 and 26. Lead 28 is electrically connected to the foil diaphragm. Note that many different shapes of the inner and outer conductive surfaces are possible.

FIG. 2 shows a pictorial representation of a hybrid circuit (discrete and integrated circuit elements), circuit 52 which outputs a signal which is nearly linearly proportional to the changes in pressure applied to the transducer. The circuit 52 can be of the type disclosed in FIG. 4 of U.S. Pat. No. 4,227,419 (assigned to the assignee of the present invention) which outputs a variable DC voltage or a variable signal which is linearly proportional to the higher pressure applied to the foil diaphragm. Alternatively, the circuit disclosed in U.S. Pat. No. 4,398,426 (also assigned to the assignee of the present invention) can be utilized to generate an output signal linearly proportional to the pressure applied to the foil diaphragm.

In all cases it is understood that the above-described embodiments are merely illustrative of a number of the many possible specific embodiments which can represent applications of the principles of the present invention. By way of example and not limitation, the washer 20 may be omitted and the diaphragm may be directly secured by the upper casing 10 or merely held in place by the epoxy adhesive ring 16. Numerous and various other arrangements can be readily devised in accordance with these principles by those skilled in the art without departing from the scope of this invention.

what is claimed is:

1. A low pressure capacitive transducer assembly comprising:
   a nonconductive plate having a substantially planar surface;

a thin electrically conductive layer deposited on said planar surface;

an epoxy layer silk-screened to form a border around said conductive layer on said planar surface;

a planar metal foil diaphragm member having a flat surface, said diaphragm member being positioned with said flat surface opposite said planar surface and with its periphery firmly in contact with said epoxy layer, but not in contact with said conductive layer;

the central area of said foil diaphragm member being free of engagement with other portions of said transducer assembly;

said foil diaphragm member being between ⅓ and 3 mils thick, and being spaced away from said conductive layer by a distance of between ½ mil and 20 mils;

a retaining member of approximately the shape of said epoxy layer, said retaining member engaging said diaphragm member on the opposite side thereof from said epoxy layer, such that the capacitance between said diaphragm member and said thin electrically conductive layer is at a predetermined level and means for detecting changes in the capacitance between said foil diaphragm member and said thin conductive layer.

2. A low pressure capacitive transducer assembly as defined in claim 1 wherein said foil diaphragm member is a stainless steel foil.

3. A low pressure capacitive transducer assembly as defined by claim 1 wherein said retaining member is comprised of a steel washer.

4. A low pressure capacitive transducer assembly as defined by claim 1, wherein said assembly includes an electronic circuit for producing a signal which is linearly related to the capacitance between said thin electrically conductive plate and said diaphragm member.

5. A low pressure capacitive transducer as defined by claim 1 wherein said epoxy layer is slightly thicker than said electrically conductive plate.

6. A low pressure capacitive transducer as defined by claim 1 wherein said nonconductive plate is made of alumina.

7. A low pressure capacitive transducer as defined by claim 1 wherein first and second thin electrically conductive plates are deposited on said planar surface of said nonconductive plate, with said first conductive plate being essentially circular in shape with an electrically conductive lead, and said second plate forming a ring around said first plate and also having an electrical lead.

8. A method for forming a low pressure capacitive transducer comprising the steps of:

depositing a thin electrically conductive plate on a planar surface of a nonconductive plate;

silk-screening an epoxy layer slightly thicker than said electrically conductive plate around the marginal edge of said planar surface of said nonconductive plate;

placing a foil diaphragm having a central area which is free of engagement with other parts of said transducer, on top of said epoxy layer;

placing a retaining member of approximately the shape of said epoxy layer on top of said diaphragm member; and pressing said diaphragm member toward said thin electrically conductive plate with said retaining member until the capacitance between said diaphragm and said thin electrically conductive plate reaches a predetermined level, and said diaphragm and said conductive plate are spaced apart by a distance of between ½ and 20 mils.

9. A method defined in claim 8 wherein the depositing of the thin electrically conductive plate further comprises the step of depositing a first conductive plate and a second plate, wherein said first and second plates do not overlap.

10. A low pressure capacitive transducer comprising:
a nonconductive plate having a planar surface;
a thin electrically conductive layer deposited on said planar surface;
a planar metal foil diaphragm member having a flat surface, means for sealing the space between the outer edges of said diaphragm member and said plate, wherein said sealing means is a ring of epoxy around said conductive layer, and further comprising a circular member of approximately the shape of said epoxy ring, said circular member engaging said diaphragm member on the opposite side thereof from said epoxy layer, such that the capacitance between said diaphragm member and said thin electrically conductive layer is at a predetermined level, said diaphragm member being mounted with said flat surface opposite said planar surface and with its periphery firmly in contact with said epoxy but not in contact with said conductive layer;

the central area of said foil diaphragm member being free of engagement with other portions of said transducer assembly;

said foil diaphragm member being between ⅓ and 3 mils thick, and being spaced away from said conductive layer by a distance of between ½ mil and 20 units; and means for detecting changes in the capacitance between said foil diaphragm member and said thin conductive layer.

11. A low pressure capacitive transducer as defined by claim 10 wherein said circular member is comprised of a steel washer.

12. A low pressure capacitive transducer as defined by claim 10 further comprising an electronic circuit for producing a signal which is linearly related to the capacitance between said thin electrically conductive layer and said diaphragm member.

13. A low pressure capacitive transducer as defined by claim 10 wherein said ring of epoxy is slightly thicker than said electrically conductive layer.

14. A low pressure capacitive transducer as defined by claim 10 wherein said nonconductive plate is made of alumina.

15. A low pressure capacitive transducer as defined by claim 10, including two spaced conductive layers on said plate and wherein said first conductive layer is essentially circular in shape with an extension to an electrically conductive lead, and said second conductive plate forms a broken ring around said first plate and also having an extension to an electrical lead, and said extension of said first conductive plate extends through a break in said ring of said second conductive plate.

16. A low pressure transducer as defined in claim 11 wherein said circular member is a stainless steel washer.

17. A low pressure capacitive transducer as defined in claim 10 wherein said ring of epoxy is a silk-screened ring of epoxy.

* * * * *